United States Patent [19]
Uchida

[11] Patent Number: 5,259,678
[45] Date of Patent: Nov. 9, 1993

[54] PRINTING APPARATUS FOR NEGOTIABLE INSTRUMENTS AND SECURITIES

[75] Inventor: Shinya Uchida, Tokyo, Japan

[73] Assignee: Laurel Bank Machines Co., Ltd., Tokyo, Japan

[21] Appl. No.: 667,397

[22] PCT Filed: Apr. 16, 1990

[86] PCT No.: PCT/JP90/00493

§ 371 Date: Apr. 2, 1991

§ 102(e) Date: Apr. 2, 1991

[87] PCT Pub. No.: WO91/03799

PCT Pub. Date: Mar. 21, 1991

[30] Foreign Application Priority Data

Sep. 6, 1989 [JP] Japan ................................. 1-231221

[51] Int. Cl.$^5$ .................................................. B41J 3/54
[52] U.S. Cl. ........................................ 400/82; 400/103
[58] Field of Search ...................... 400/73, 74, 82, 703, 400/708, 103; 235/462, 475

[56] References Cited

U.S. PATENT DOCUMENTS

| | | | |
|---|---|---|---|
| 4,196,846 | 4/1980 | Kao et al. | 235/475 |
| 4,561,532 | 12/1985 | Svyatsky et al. | 400/82 |
| 4,623,965 | 11/1986 | Wing | 400/82 |
| 4,699,531 | 10/1987 | Ulinski, Sr. et al. | 400/74 |
| 4,969,760 | 11/1990 | LaManna et al. | 400/134 |
| 5,037,216 | 8/1991 | Nubson et al. | 400/120 |

FOREIGN PATENT DOCUMENTS 1214494 8/1989 Japan .
63869 3/1990 Japan ............................. 400/82

Primary Examiner—David A. Wiecking
Attorney, Agent, or Firm—Keck, Mahin & Cate

[57] ABSTRACT

A printing apparatus for negotiable instruments and securities which can print visually unrecognizable data consisting of MICR characters, barcodes or the like on negotiable instruments or securities and judge whether or not the visually unrecognizable data are exactly printed thereon, the printing apparatus for negotiable instruments and securities including a blank storing section (2) for storing stacked blanks (1) for instruments or securities, a first printer (11, 14) for printing visually recognizable data on the blanks (1), a second printer (23, 24) for printing visually unrecognizable data on the blanks (1), a reader (32, 33) for reading out the visually unrecognizable data, an instrument or security storing section (36) for storing the stacked blanks (1) for which the printing operation and the reading operation have been completed as instruments or securities (1a), a blank transporting mechanism (3, 4, 5, 8, 10, 21, 22, 25, 31) for transporting the blanks (1) from the blank storing section (2) to the instrument or security storing section (36) via the first printer (11, 14), the second printer (23, 24) and the reader (32, 33), a controller (52) for controlling the first printer (11, 14), the second printer (23, 24), the reader (32, 33) and the blank transporting mechanism (3, 4, 5, 8, 10, 21, 22, 25, 31), and a discriminator (54) for judging whether or not the visually unrecognizable data have been exactly printed on the blanks (1) by the second printer (23, 24).

4 Claims, 3 Drawing Sheets

PROMISSORY NOTE  No. _FX11117_ ⎫A

┌─ ─ ─ ─ ─ ─┐
│ REVENUE   │
│ STAMP     │
└─ ─ ─ ─ ─ ─┘

PAYABLE TO _____

AMOUNT _____

THE ABOVE AMOUNT WILL BE PAID TO YOU OR YOUR
ORDER IN EXCHANGE FOR THIS PROMISSORY NOTE

DATE : HEISEI
DRAWER
ADDRESS
DRAWER

[TOKYO 1301]
[0000-001] ⎫A

┌─────────────────────────────────────┐
│ DATE OF PAYMENT : HEISEI            │
│ PLACE OF PAYMENT : MINATO-KU, TOKYO ⎫A
│ LOCATION OF PAYMENT :               │
│ BUSINESS DEPARTMENT,                │
│ HEAD OFFICE OF LAUREL BANK          │
└─────────────────────────────────────┘

LAUREL BANK ⎫A

⎫B  ⑴⑈" ⑈⑉⑊⑆⑇⑈⑈⑈⑉⑋ ⑈⑈⑈⑉⑊⑆⑈⑈⑈⑉⑋ ⑈⑈⑈⑉⑋

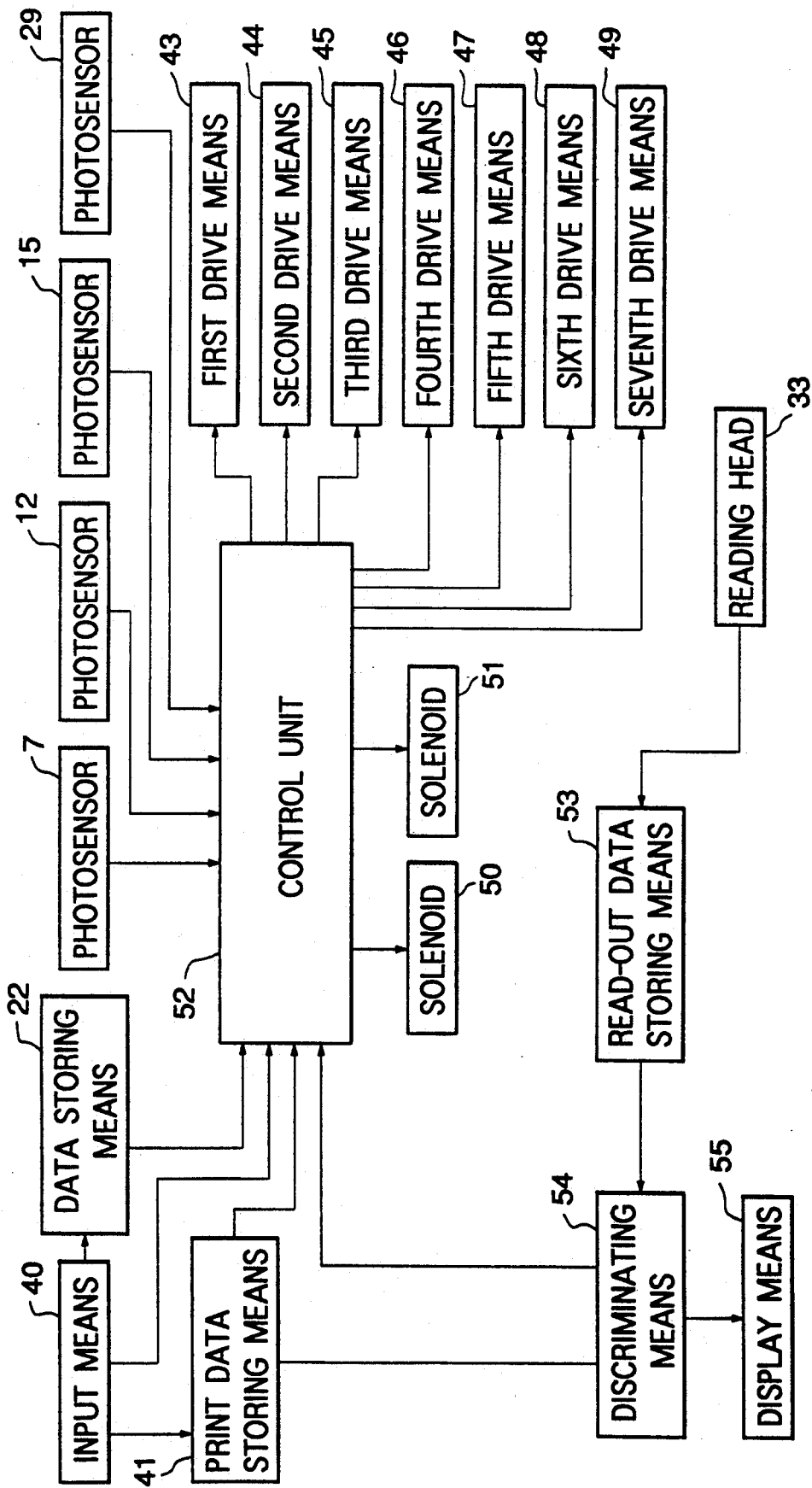

PRINTING APPARATUS FOR NEGOTIABLE INSTRUMENTS AND SECURITIES

TECHNICAL FIELD

The present invention relates to a printing apparatus for negotiable instruments such as notes and checks, and securities such as stocks and bonds (hereinafter referred to collectively as "instruments"), and, in particular, to such a printing apparatus for instruments capable of printing necessary data on the instruments and judging whether or not the necessary data have been exactly printed.

BACKGROUND ART

Instruments are generally delivered to the recipient after necessary data have been printed thereon. For example, in cases of notes and checks, data such as the name of payer, the place of payment, the name of drawer, the place of drawing, the place of exchange, the name of the bank, the name of the bank branch, the account number or the like are printed thereon for each customer and they are delivered to the customer in the number that the customer requires.

These data usually include data consisting of visually recognizable characters, numerals, symbols, figures or the like and data consisting of magnetic ink recognition characters, numerals, symbols or the like (hereinafter referred to as "MICR character") or symbols such as barcodes (hereinafter referred to collectively as "visually unrecognizable data").

The "visually unrecognizable data" is recognizable as a symbol (such as a bar code), having a generally understood function, but such a symbol cannot generally be "read" or "recognized" by an ordinary person without the use of a reading device.

From the viewpoint of the nature of such instruments errors in the printing of these data are tollally inadmissible and, therefore, it is indispensable to judge after printing whether or not the data are exactly printed.

Although such judgment can be relatively easily made as to the data consisting of visually recognizable characters, numerals, symbols, figures or the like, since it is impossible to judge whether the visually unrecognizable data are exactly printed, unless they are read out by an independent reading-out apparatus after the instrument has been made out, it is troublesome to make such judgment.

DISCLOSURE OF INVENTION

It is an object of the present invention to provide a printing apparatus for instruments capable of printing necessary data on instruments on which visually unrecognizable data are to be printed and easily judging whether or not the data are exactly printed.

The above object of the present invention can be accomplished by a printing apparatus for instruments comprising a blank storing means for storing stacked instrument blanks therein, a first printing means for printing data consisting of visually recognizable characters, numerals, symbols, figures or the like on said instrument blanks, a second printing means for printing visually unrecognizable data on said instrument blanks, said second printing means being disposed downstream of said first printing means, a data reading-out means for reading out the visually unrecognizable data printed by said second printing means, said data reading-out means being disposed downstream of said second printing means, an instrument storing means for storing stacked instruments for which printing the data and reading out the data have been completed, said instrument storing means being disposed downstream of said data reading-out means, a blank transporting means for transporting the instrument blanks from said blank storing means to said instrument storing means via said first printing means, said second printing means and said data reading-out means, a control means for controlling said first printing means, said second printing means, said data reading-out means and said blank transporting means, and a discriminating means for judging based upon read-out signals from said data reading-out means whether or not said visually unrecognizable data have been exactly printed by said second printing means.

According to the present invention, since the printing apparatus for instruments includes the data reading-out means for reading out the visually unrecognizable data printed by the second printing means and the discriminating means for judging based upon the read-out signals from the data reading-out means whether or not the visually unrecognizable data have been exactly printed in addition to the first printing means for printing the data consisting of visually recognizable characters, numerals, symbols, figures or the like and the second printing means for printing the visually unrecognizable data, it is possible to print necessary data on the instrument blanks and judge whether or not the visually unrecognizable data have been exactly printed and since it is unnecessary to judge whether or not the visually unrecognizable data have been exactly printed by an independent reading-out apparatus after making out the instruments, it is possible to remarkably easily carry out the printing of data on the instrument blanks and make the judgment as to whether or not visually unrecognizable data have been exactly printed.

In a preferred aspect of the present invention, said control means is constituted so that in case where it judges that the leading edge of an instrument blank is not positioned upstream of the data reading-out means when printing the visually unrecognizable data has been completed by the second printing means, the instrument blank is transported upstream by driving said blank transporting means until the leading edge of the instrument blank is positioned upstream of the data reading-out means and then the instrument blank is transported to the data reading-out means by driving the blank transporting means, thereby to cause the data reading-out means to read out the visually unrecognizable data.

According to the preferred aspect of the present invention, even if the second printing means and the data reading-out means are disposed close to each other for making the printing apparatus for instruments small in size and as a result, the leading edge of the instrument blank is positioned within the data reading-out means or downstream thereof when printing the visually unrecognizable data has been completed by the second printing means, since the instrument blank is transported by the blank transporting means prior to reading out the visually unrecognizable data by the data reading-out means so that the leading edge thereof is positioned upstream of the data reading-out means, it is possible to read out the visually unrecognizable data by the second printing means without fail, thereby to make it possible to judge whether or not the visually unrecognizable data have been exactly printed.

In another preferred aspect of the present invention, a blank delivering means is provided between said first printing means and said second printing means for delivering instrument blanks therebetween, said blank delivering means comprising a main transporting passage communicating the first printing means with the second printing means and a bifurcated transporting passage diverged from the main transporting passage, said main transporting passage being disposed so that the instrument blanks can be transported to the second printing means when they are transported downstream from the first printing means, said bifurcated transporting passage being disposed so as to receive the instrument blanks therein when they are transported from downstream to upstream, and said control means is constituted so that in case where it judges that the leading edge of an instrument blank is not positioned upstream of the data reading-out means when printing the visually unrecognizable data has been completed by the second printing means, the instrument blank is transported upstream into the bifurcated transporting passage by driving said sheet transporting means until leading edge of the instrument blank is positioned upstream of the data reading-out means and then the instrument blank is transported to the data reading-out means by driving the sheet transporting means, thereby to cause the data reading-out means to read out the visually unrecognizable data.

According to the another preferred aspect of the invention, even if the second printing means and the data reading-out means are disposed close to each other for making the printing apparatus for instruments small in size and as a result, since the leading edge of an instrument blank is positioned within the data reading-out means or downstream thereof when printing the visually unrecognizable data has been completed by the second printing means, the instrument blank is transported by the blank transporting means prior to reading out the visually unrecognizable data by the data reading-out means so that the leading edge thereof is positioned upstream of the data reading-out means, since the instrument blank can be transported into the bifurcated transporting passage and is never transported into the first printing means, it is reliably possible to prevent the instrument blank from being transported into the first transporting passage and jamming therein.

In a further preferred aspect of the present invention, the control means is constituted so that it drives the blank transporting means so as to transport an instrument blank after printing the visually unrecognizable data has been completed by the second printing means and before reading out the visually unrecognizable data by the data reading-out means is started, until the leading edge thereof is positioned at a predetermined position upstream of the data reading-out means.

BRIEF DESCRIPTION OF DRAWINGS

FIG. 1 is a schematic plan view of a promissory note which is an example of an instrument on which data are printed by a printing apparatus for instruments which is an embodiment of the present invention.

FIG. 3 is a block diagram showing an input system, a control system, a drive system and an output system of a printing apparatus for instruments which is an embodiment of the present invention.

BEST MODE FOR CARRYING OUT THE INVENTION

FIG. 1 is a schematic plan view of a promissory note of a type commonly used in Japan and is a typical example of instruments on which data are printed by a printing apparatus for instruments which is an embodiment of the present invention. In FIG. 1, a portion shown by the character A shows data consisting of visually recognizable characters and numerals printed by the printing apparatus for instruments which is an embodiment of the present invention, a portion shown by the character B shows data consisting of MICR characters printed by the printing apparatus for instruments which is an embodiment of the present invention and other characters, numerals, symbols and figures show characters, numerals, symbols and figures commonly printed for all promissory notes which have been printed on a promissory note prior to the printing by the printing apparatus for instruments which is the embodiment of the present invention.

Figure 2:
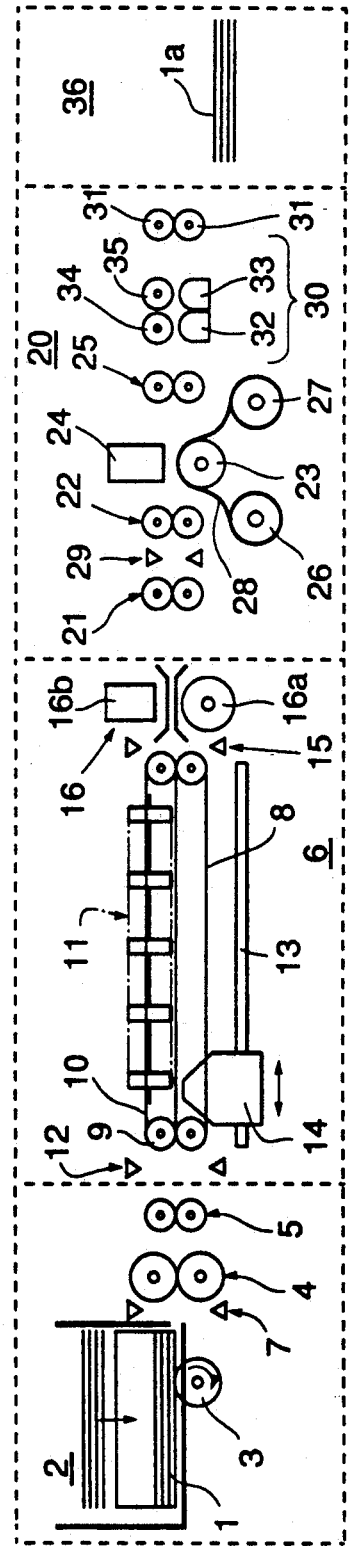
FIG. 2 is a schematic drawing showing a side view of a printing apparatus for instruments which is an embodiment of the present invention.

FIG. 2 is a schematic drawing showing a side view of a printing apparatus for instruments which is an embodiment of the present invention. Hereinafter, description will be made as to a case where characters and numeral shown by the character A and the MICR characters shown by the character B are printed on a promissory note which has already been printed with characters, numerals, symbols and figures to be commonly printed.

In FIG. 2, the printing apparatus for instruments which is an embodiment of the present invention includes a blank storing section 2 for storing stacked promissory note blanks 1 and promissory note blanks 1 are taken out successively from the bottommost blank one by one from the blank storing section 2 by a friction force applied from a takeout roller 3 disposed so as to project from an opening (not shown) formed in the bottom plate of the blank storing section 2.

The promissory note blanks 1 which have been taken out from the blank storing section 2 are held by roller pairs 4 and 5 and fed into a printing section 6 for printing data consisting of visually recognizable characters and numerals thereon. The reference numeral 7 designates a photosensor for counting the number of the promissory note blanks which have been taken out from the blank storing section 2 and outputting count signals to a control system (not shown).

There are disposed in the printing section 6 a pair of first transporting belts 8 for supporting the promissory note blank on a lower face in the vicinity of opposite side edges thereof and transporting it from upstream to downstream and a pair of second transporting belts 10 wound about pulleys 9 which are disposed above the first transporting belts 8 and are movable in the vertical direction, the second transporting belts being adapted for transporting the promissory note blank 1 being held between themselves and the first transporting belts 8 when the pulleys 9 are positioned at their lower positions. Further, a transporting roller 11 movable in the vertical direction is provided between the pair of second transporting belts 10, the transporting roller being adapted for moving the promissory note blank 1 in the direction perpendicular to that of a transporting passage formed by the first transporting belts 8 and the second transporting belts 10 when it is positioned at its lower position. The reference numeral 12 designates a photosensor for detecting whether the leading edge of the promissory note blank 1 has abutted against the first transporting belts 8 and the second transporting belts 10 and outputting detection signals to the control system (not shown).

A guide member 13 is disposed below the transporting roller 11 and at a position opposite to the transporting roller 11, the guide member extending along the transporting passage formed by the first transporting belts 8 and the second transporting belts 10, and there is mounted on the guide member 13 a dot printer 14 which is movable along the guide member 13 and is adapted for printing the data consisting of visually recognizable characters and numerals on the promissory note blanks 1.

In the thus constituted printing section 6, when the promissory note blank 1 is transported to a predetermined position by the first transporting belts 8 and the second transporting belts 10, the first transporting belts 8 and the second transporting belts 10 are stopped, the pulleys 9 are retracted upwardly and the data are printed on the promissory note blank 1 by the dot printer 14. More specifically, the transporting roller 11 is lowered to back up the promissory note blank 1 and rotated as occasion demands to move the promissory note blank 1 in the direction perpendicular to that of the transporting passage, while the dot printer 14 is moved along the guide memeber 13. Thus, the predetermined data are printed on a predetermined portion of the promissory note blank 1.

Downstream of the first transporting belts 8 and the second transporting belts 10 in the printing section 6, there is provided a photosensor 15 for detecting that the printing has been completed by the dot printer 14 and that the promissory note blank 1 has been fed out from the first transporting belts 8 and the second transporting belts 10 by detecting the rear edge of the promissory note blank 1 and outputting detection signals to the control system (not shown), and there is provided further downstream of the photosensor 15 a check writer 16 for printing numerals with a predetermined type face on the instrument in the case where it is required to print an amount of money on the instrument such as checks drawn by a bank when issuing the instrument. The check writer 16 includes a roller 16a on the periphery of which numerals are carved and a hammer 16b for hitting the instrument on the periphery of the roller 16a, thereby to print the numerals of, for example, an amount of money on the instrument.

Downstream of the printing section 6, there is provided a printing and reading section 20 for printing data consisting of the MICR characters to be read out by a machine on the promissory note blank 1 and reading out the data consisting of the MICR characters printed on the promissory note blank 1.

In the printing and reading section 20, there are provided a roller pair 21 and a roller pair 22 for respectively holding the promissory note blank 1 and transporting it and the promissory note blank 1 which has been printed with the visually recognizable characters and numerals in the printing section 6 is fed to a portion between a printing roller 23 on the periphery of which the MICR characters are carved and a pressing member 24, where it is held by the roller pairs 21 and 22 and a roller pair 25 provided downstream of the printing roller 23. A ribbon 28 is laid on the periphery of the printing roller 23, the ribbon 28 being wound around a bobbin 26 and intermittently unwound by a bobbin 27. Since the ribbon 28 is impregnated with magnetic ink, the MICR characters carved on the printing roller 23 are printed on the promissory note blank 1 by pressing the pressing member 24 on the promissory note blank 1. The roller pairs 21, 22 and 25 are rotatable by a drive means (not shown) so as to stepwise transport the promissory note blank 1 downstream and the printing roller 23 is rotatable by a drive means (not shown) so as to print the MICR characters to be printed on the promissory note blank 1. Thus, after a MICR character is printed on the promissory note blank 1, the promissory note blank 1 is transported downstream by a distance corresponding to one character by the roller pairs 21, 22 and 25, while the printing roller 23 is rotated until a portion thereof on which a MICR character to be printed next is carved opposes to the pressing member 24 and the MICR character to be printed is printed on the promissory note blank 1 by pressing the pressing member on the promissory note blank 1. The data consisting of the MICR characters to be printed are printed on the promissory note blank 1 by repeating such an operation a required number of times. The reference numeral 29 designates a photosensor disposed between the roller pair 21 and the roller pair 22 for detecting the leading edge of the promissory note blank 1 and outputting detection signals to the control system (not shown).

A reading section 30 is provided downstream of the roller pair 25 and a roller pair 31 is provided downstream of the reading section 30. The reading section includes a magnetizing head 32 for magnetizing a printed portion of the promissory note blank 1 consisting of the MICR characters and a reading head 33 for magnetically reading the magnetized printed data and is further provided with back-up rollers 34, 35 for holding the promissory note blank 1 so as to keep a space between it, and the magnetizing head 32 and the reading head 33 below a predetermined value.

In this embodiment, the printing roller 23 and the reading section 30 are disposed close to each other for making the printing apparatus for instruments small in size. Therefore, when printing the data consisting of the MICR characters on the promissory note blank 1 has been completed, the printed portion of the promissory note blank 1 can be positioned within the reading section 30 or downstream thereof and the data cannot be read out depending upon the kind of instruments to be printed. In this embodiment, the control system is constituted for solving such a problem so that when it is detected that the data consisting of the MICR characters has been printed on the promissory note blank 1, it drives a drive means (not shown) so as to rotate the roller pairs 21, 22 and 25 thereby to reversely transport the promissory note blank 1 upstream until the photosensor 29 detects the leading edge of the promissory note blank 1 before the reading section 30 reads out the data consisting of the MICR characters and then starts the reading operation of the reading section 30.

After the promissory note blank 1 is reversely transported upstream until the photosensor 29 detects the leading edge thereof, it is fed by the roller pairs 21, 22 and 25 into the reading section 30 where the printed portion is magnetized by the magnetizing head 32 and the magnetized printed portion is magnetically read out by the reading head 33 to be output to the control system (not shown) and it is further transported by the roller pair 31 into an instrument storing section 36 to be stored therein.

FIG. 3 is a block diagram showing an input system, a control system, a drive system and an output system of the printing apparatus for instruments which is an embodiment of the present invention.

In FIG. 3, the input system, the control system, the drive system and the output system of the printing apparatus for instruments which is an embodiment of the present invention comprises an input means 40 for inputting the kind and the number of instruments to be printed, the data consisting of visually recognizable characters and numerals to be printed on the promissory note blank 1 in this embodiment and a print start signal, a print data storing means 41 for temporarily storing the data consisting of the visually recognizable characters and numerals, converting these data to the data consisting of the MICR characters and temporarily storing them, a data storing means 42 for temporarily storing the kind and the number of the instruments to be printed, a control unit 52 for controlling, based upon the data stored in the print data storing means 41, the data stored in the data storing means 42 and the detection signals output from the photosensors 7, 12, 15 and 29, a first drive means 43 for driving the take-out roller 3, the roller pair 4 and the roller pair 5, a second drive means 44 for driving the first transporting belts 8 and the second transporting belts 10, a third drive means 45 for driving the transporting roller 11, a fourth drive means 46 for driving the dot printer 14, a fifth drive means 47 for driving the roller pairs 21, 22, 25 and 31, a sixth drive means 48 for rotating the print roller 23, a seventh drive means 49 for rotating the roller 16a of the check writer 16, a solenoid 50 for driving the hammer 16b of the check writer 16 and a solenoid 51 for driving the pressing member 24, a read-out data storing means 53 for temporarily storing the data consisting of the MICR characters and read out by the reading head 33 based upon read-out signals from the reading head 33, a discriminating means 54 for judging whether or not the data stored in the print data storing means 41 and the read-out data stored in the read-out data storing means 53 agree with each other and outputting a normal signal when it judges that they agree and an abnormal signal when it judges that they do not agree, and a display means 55 for displaying the result of judgment made by the discriminating means 54.

In the thus constituted printing apparatus for instrument which is an embodiment of the present invention, when the kind of instruments, that is, a promissory note in this embodiment, the number of the promissory notes and the data consisting of the visually recognizable characters and numerals are input to the input means 40 by an operator, the print data storing means 41 temporarily stores these input data, converts these data consisting of the visually recognizable characters and numerals to data consisting of the MICR characters and temporarily stores the thus converted data. Then, when the print start signal is input to the input means 40, the control unit 52 outputs a drive signal to the first drive means 43 to enable the same to rotate the take-out roller 3, whereby the promissory note blanks 1 stacked in the blank storing section 2 are taken out one by one successively from the bottommost promissory note blank 1 and to enable the same to rotate the roller pairs 4 and 5, whereby the taken-out promissory note blanks 1 are fed one by one into the printing section 6. The photosensor 7 counts the number of the promissory note blanks 1 taken out from the blank storing section 2 and outputs the detection signal to the control unit 52.

When the photosensor 12 detects that the leading edge of the promissory note blank 1 fed into the printing section 6 comes into abutment against the first transporting belts 8 and the second transporting belts 10, it outputs the detection signal to the control unit 52 and the control unit 52 outputs a drive signal to the second drive means 44 in accordance with this detection signal, thereby to drive the first transporting belts 8 and the second transporting belts 10 so that the promissory note blank 1 is transported downstream, while it is held between the first transporting belts 8 and the second transporting belts 10. When the control unit 52 judges based upon the instrument kind input from the input means 40 that the promissory note blank 1 is transported by the first transporting belts 8 and the second transporting belts 10 by a predetermined distance, it outputs a drive stop signal to the second drive means 44, thereby to stop the first transporting belts 8 and the second transporting belts 10. Thus, in accordance with the kind of instruments, the instrument blank is held at a desired position between the first transporting belts 8 and the second transporting belts 10.

Then, the control unit 52 outputs drive signals to the third drive means 45 and the fourth drive means 46 so as to rotate the transporting roller 11 as well as lower the same and to move the dot printer 14 along the guide member 13, thereby to print the data consisting of the visually recognizable characters and numerals on the desired position of the promissory note blank 1. Thus, when the control unit 52 detects that the printing operation of the data consisting of the visually recognizable characters and numerals has been completed and after the reading operation of the data consisting of the MICR characters printed on the preceding promissory note blank 1 was completed by the reading section 30, a normal signal has been input from the discriminating means 54, the control unit 52 outputs the drive signal to the second drive means 44 again, thereby to drive the first transporting belts 8 and the second transporting belts 10 so as to feed the promissory note blank 1 into the printing and reading section 20 via the check writer 16. In this embodiment, since the instrument is a promissory note, no drive signal is output to the seventh drive means 49 and the solenoid 50 and the control unit 52 outputs a drive signal to the fifth drive means 47 at the same time it outputs the drive signal to the second drive means 44. As a result, the roller pairs 21, 22, 25 and 31 are rotated and the promissory note blank 1 is fed into the printing and reading section 30.

Then, when the photosensor 15 detects the rear edge of the promissory note blank 1, the detection signal is output to the control unit 52 and based upon the detection signal, the control unit 52 outputs the drive signal to the first drive means 43 to take out the promissory note blank 1 to be printed next from the blank storing section 2 as well as outputs the drive signal to the second drive means 44.

Further, when the photosensor 29 detects the leading edge of the promissory note blank 1, the detection signal is output to the control unit 52 and based upon the detection signal and in accordance with the instrument kind input from the input means 40, the control unit 52 outputs drive signals to the sixth drive means 48 and the solenoid 51 after a predetermined time period has passed and controls the rotation of the roller pairs 21, 22 and 25 and the printing roller 23 and the driving of the pressing member 24 so that the MICR characters to be printed are printed on the desired portions of the promissory note blank 1 and the data consisting of the MICR characters are printed on the promissory note blank 1.

When the control unit 52 judges that the data consisting of the MICR characters have been printed, it outputs a reverse drive signal to the fifth drive means 47 and rotates the roller pairs 21, 22, 25 and 31 in the reverse direction to transport the promissory note blank 1 upstream, that is, in the reverse direction, until the photosensor 29 detects the leading edge of the promissory note blank 1. Then, when the photosensor 29 detects the leading edge of the promissory note blank 1, the detection signal is output to the control unit 52 and based upon the detection signal, the control unit 52 outputs a read-out signal to the reading section 30 and also outputs the drive signal to the fifth drive means 47 so as to rotate the roller pairs 21, 22, 25 and 31. As a result, the promissory note blank 1 is transported within the reading section 30 and the portions on which the MICR characters are printed are magnetized successively by the magnetizing head 32. Further, the magnetized MICR characters are successively read out by the reading head 33 and read-out signals are output to the read-out data storing means 53 and temporarily stored therein.

When the promissory note blank 1 passed through the reading section 30 and the data consisting of the MICR characters were read out by the reading section 30, the promissory note blank 1 has been fed into the instrument storing section 36 as a promissory note 1a and the read-out data have been stored in the read-out data storing means 53. In the case where the control unit 52 judges that the reading operation of the data consisting of the MICR characters has been completed, it causes the print data storing means 41 to output the data to be printed and temporarily stored therein and the read-out data storing means 53 to output the read-out data temporarily stored therein to the discriminating means 54 where it is judged whether or not these data agree with each other. As a result, in the case where the discriminating means 54 judges that the data to be printed and the read-out data agree with each other, it outputs a normal signal to the display means 55 and the control unit 52, while in the case where the discriminating means 54 judges that the data to be printed and the read-out data do not agree, it outputs an abnormal signal to the display means 55 and the control unit 52, whereby the result of the judgment is displayed by the display means 55. When the control unit 52 receives the normal signal from the discriminating means 54 and judges that the data have been printed on the following promissory note blank 1 in the printing section 6, it outputs a drive signal to the second drive means 44. On the other hand, when the control unit 52 receives the abnormal signal from the discriminating means 54, it outputs drive stop signals to the first drive means 43, the second drive means 44, the third drive means 45, the fourth drive means 46, the fifth drive means 47 and the sixth drive means 48, thereby to stop the operation of the printing apparatus for instruments. Accordingly, the operator can know based upon the result of the judgment displayed by the display means 55 that the data consisting of the MICR characters were erroneously printed and it is possible to remove and collect the promissory note 1a on which the data consisting of the MICR characters were erroneously printed from among the promissory notes 1a stacked in the instrument storing section 36.

Afterward, when a print start signal is input to the input means 40, the control unit 52 outputs drive signals to the second drive means 44 and the fifth drive means 47 so that the following promissory note blank 1 is fed into the printing and reading section 20 and the printing and reading operation of the printing apparatus for instruments is restarted.

When the photosensor 7 detects that the promissory note blanks 1 the number of which is equal to that of the promissory note blanks input to the input means 40 have been taken out from the blank storing section 2 by the take-out roller 3 and the printing operation for the promissory note blank 1 which has been taken out last has been completed in the printing section 6, whereby the rear edge thereof is detected by the photosensor 15, the control unit 52 outputs drive stop signals to the first drive means 43, the second drive means 44, the third drive means 45 and the fourth drive means 46. Further, when the control unit 52 judges that the printing operation of the data consisting of the MICR characters and the reading operation in the reading section 30 for the last promissory note blank 1 have been completed and the last promissory note blank 1 has been fed into the instrument storing section 36, the control unit 52 outputs a drive stop signal to the fifth drive means 47, thereby to complete the printing and reading operation of data in the printing apparatus for instruments.

Figure 4:
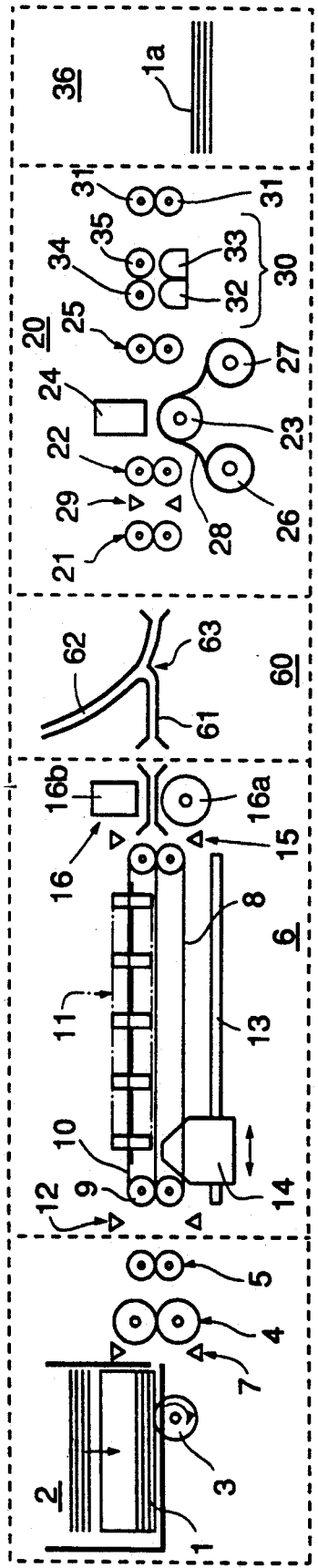
FIG. 4 is a schematic drawing showing a side view of a printing apparatus for instruments which is another embodiment of the present invention.

FIG. 4 is a schematic drawing showing a side view of a printing apparatus for instruments which is another embodiment of the present invention.

The printing apparatus for instruments shown in Figure 4 has the same configuration as that of the printing apparatus for instruments shown in FIG. 2 except that a blank delivering section 60 is provided between the printing section 6 and the printing and reading section 20.

More specifically, as shown in FIG. 4, the blank delivering section 60 includes a main transporting passage 61 communicating the printing section 6 and the printing and reading section 20 and a bifurcated transporting passage 62 diverged from the main transporting passage 61 and extending obliquely upward in the upstream direction. In the case where the promissory note blank 1 is transported downstream from the printing section 6, the promissory note blank 1 is transported to the printing and reading section 20 via the main transporting passage 61. However, in the case where the promissory note blank 1 is reversely transported upstream prior to the reading of the data consisting of the MICR characters, since there is formed on the bottom face of the main transporting passage 61 just downstream of a portion where the bifurcated transporting passage 62 is diverged therefrom a guide 63 consisting of a projection projecting upwardly, the promissory note blank 1 is led into the bifurcated transporting passage 61 by the guide 63 and is fed into the bifurcated transporting passage 62 until the photosensor 29 detects the leading edge thereof. Therefore, the promissory note blank 1 can be prevented from being fed into the printing section 6 in the case where it is reversely transported.

In the printing apparatus for instruments shown in FIG. 4 which includes the blank delivering section 60 and in which the printing roller 23 and the printing and reading section 20 are disposed close to each other for making the apparatus small in size, although since the portion on which the data consisting of the MICR characters are printed may be positioned within the reading section 30 or downstream of the reading section 30 depending upon the kind of instruments when the printing operation of the data consisting of the MICR characters has been completed and it is necessary to transport the promissory note blank 1 upstream by reversely rotating the roller pairs 21, 22, 25 and 31 prior to the reading operation in the reading section 30, until the photosensor 29 detects the leading edge of the promissory note blank 1, even in this case, the promissory note blank 1 is not fed into the printing section but fed into the bifurcated transporting passage 62 without fail. Accordingly, in cases where the length of the instruments is much different among different kinds thereof, for instance, in the case of promissory notes and checks used in Japan, wherein the length of promissory notes is about as twice as that of checks, even if the data consisting of the MICR characters are printed on the longer instrument blank, for example, a promissory note blank 1, and the promissory note blank 1 is transported upstream prior to reading the data consisting of the MICR characters until the photosensor 29 detects the leading edge of the promissory note blank 1, the promissory note blank 1 is never transported to the printing section 6 and it is possible without fail to prevent the promissory note blank from interferring with a mechanism in the printing section 6 and jamming. In addition, the bifurcated transporting passage 62 diverged from the main transporting passage 61 is disposed to extend obliquely upward in the upstream direction, so that even if the distance between the printing section 6 and the printing and reading section 20, that is, the length of the blank delivering section 60 is not set so long, the length of the bifurcated transporting passage 62 can be set sufficiently long and, therefore, it is possible to print and read the data for all kinds of instruments to be printed without jamming.

The present invention has thus been shown and described with reference to specific embodiments. However, it should be noted that the present invention is in no way limited to the details of the described arrangements but changes and modifications may be made without departing from the scope of the appended claims.

For example, in the above described embodiment shown in FIG. 4, although the promissory note blank 1 being reversely transported is led into the bifurcated transporting passage 62 by the guide 63 consisting of the projection projecting upwardly from the bottom face of the main transporting passage 61, a switching lever the position of which is controlled by the control unit 52 may be provided in place of the guide 63 thereby to feed the promissory note blank 1 into the bifurcated transporting passage 62 when reversely transporting the promissory note blank 1.

Further, in the above described embodiments, although after the data consisting of the MICR characters have been printed, the promissory note blank 1 is transported reversely until the photosensor 29 detects the leading edge thereof and then the data are read out in the reading section 30, in the case where the data are printed on instrument blanks having a short length and the leading edge thereof can be positioned upstream of the reading section 30 when the printing operation of the data consisting of the MICR characters has been completed, an additional sensor may be provided between the printing roller 23 and the reading section 30 for detecting the leading edge of the instrument blank, thereby to reversely transport the instrument blank only when the leading edge thereof is positioned within the reading section 30 or downstream of the reading section 30.

Furthermore, in the above described embodiments, although explanation was made as to printing the data on the promissory note blank 1, the present invention is not limited to printing data on the promissory note blank 1 and reading the data therefrom but is applicable to printing data on all kinds of instruments on which the visually unrecognizable data are to be printed such as checks or the like and reading out the data therefrom.

Moreover, in the present invention, the respective means need not necessarily be physical means and arrangements whereby the functions of the respective means can be accomplished by software fall within the scope of the present invention. In addition, the function of a single means may be accomplished by two or more physical means and the functions of two or more means may be accomplished by a single physical means.

Industrial Applicability

According to the present invention, it is possible to provide a printing apparatus for instruments capable of printing necessary data on instruments on which visually unrecognizable data ar to be printed and easily judging whether or not the data are exactly printed.

I claim:

1. A printing apparatus for negotiable instruments and securities comprising a blank storing means for storing stacked instrument or security blanks therein, a first printing means for printing data consisting of visually recognizable characters, numerals, symbols, figures or the like on said instrument or security blanks, a second printing means for printing visually unrecognizable data on said instrument or security blanks, said second printing means being disposed downstream of said first printing means, a data reading-out means for reading out the visually unrecognizable data printed by said second printing means, said data reading-out means being disposed downstream of said second printing means, an instrument or security storing means for storing stacked instruments or securities for which printing the data and reading out the data have been completed, said instrument or security storing means being disposed downstream of said data reading-out means, a blank transporting means for transporting the instrument or security blanks from said blank storing means to said instrument or security storing means via said first printing means, said second printing means and said data reading-out means, a control means for controlling said first printing means, said second printing means, said data reading-out means and said blank transporting means, and a discriminating means for judging based upon read-out signals from said data reading-out means whether or not said visually unrecognizable data have been exactly printed by said second printing means;

wherein a blank delivering means if further provided between said first printing means and said second printing means for delivering the instrument or security blanks therebetween, said blank delivering means comprising a main transporting passage communicating the first printing means with the second printing means and a bifurcated transporting passage diverged from the main transporting passage, said main transporting passage being disposed so that the instrument or security blanks can be transported to the second printing means when they are transported downstream from the first printing means, said bifurcated transporting passage being disposed so as to receive the instrument or security blanks therein when they are transported from downstream to upstream, and said control means is constituted so that in case where it judges that a leading edge of the instrument or security blank is not positioned upstream of the data reading-out means when printing of the visually unrecognizable data has been completed by the second printing means, the instrument or security blank is transported upstream into the bifurcated transporting passage by driving said blank transporting means until the leading edge of the instrument or security blank is positioned upstream of the data reading-out means and then the instrument or security blank is transported to the data reading-out means by driving the blank transporting means, thereby to cause the data reading-out means to read out the visually unrecognizable data.

2. A printing apparatus in accordance with claim 1 wherein a sensor means is further provided between said blank delivering means and said second printing means for the leading edge of said instrument or security blank and outputting a detection signal to said control means and said control means is constituted so as to drive said blank transporting means based upon said detection signal from said sensor means, thereby to feed said instrument or security blank to said data read-out means.

3. A printing apparatus for negotiable instruments and securities comprising a blank storing means for storing stacked instrument or security blanks therein, a first printing means for printing data consisting of visually recognizable characters, numerals, symbols, figures or the like on said instrument or security blanks, a second printing means for printing visually unrecognizable data on said instrument or security blanks, said second printing means being disposed downstream of said first printing means, a data reading-out means for reading out the visually unrecognizable data printed by said second printing means, said data reading-out means being disposed downstream of said second printing means, an instrument or security storing means for storing stacked instruments or securities for which printing the data and reading out the data have been completed, said instrument or security storing means being disposed downstream of said data reading-out means, a blank transporting means for transporting the instrument or security blanks from said blank storing means to said instrument or security storing means via said first printing means, said second printing means and said data reading-out means, a control means for controlling said first printing means, said second printing means, said data reading-out means and said blank transporting means, and a discriminating means for judging based upon read-out signals from said data reading-out means whether or not said visually unrecognizable data have been exactly printed by said second printing means;

wherein a blank delivering means if further provided between said first printing means and said second printing means for delivering the instrument or security blanks therebetween, said blank delivering means comprising a main transporting passage communicating the first printing means with the second printing means and a bifurcated transporting passage diverged from the main transporting passage, said main transporting passage being disposed so that the instrument or security blanks can be transported to the second printing means when they are transported downstream from the first printing means, said bifurcated transporting passage being disposed so as to receive the instrument or security blanks therein when they are transported from downstream to upstream, and said control means is constituted so that after printing of the visually unrecognizable data has been completed by the second printing means and before starting reading out the data by said data read-out means, the instrument or security blank is transported upstream into the bifurcated transporting passage by driving said blank transporting means until a leading edge of the instrument or security blank is positioned upstream of the data reading-out means and then the instrument or security blank is transported to the data reading-out means by driving the blank transporting means, thereby to cause the data read-out means to readout the visually unrecognizable data.

4. A printing apparatus in accordance with claim 3 wherein a sensor means is further provided for detecting whether or not the leading edge of said instrument or security blank is positioned at said predetermined position and outputting a detection signal to said control means.

* * * * *